(12) United States Patent
Hallenberger

(10) Patent No.: US 11,807,175 B2
(45) Date of Patent: Nov. 7, 2023

(54) CABLE HARNESS GROMMET AND METHOD FOR USING SAME

(71) Applicant: Safran Cabin Germany GmbH, Herborn (DE)

(72) Inventor: Helmut Hallenberger, Herborn (DE)

(73) Assignee: SAFRAN CABIN GERMANY GMBH, Herborn (DE)

( * ) Notice: Subject to any disclaimer, the term of this patent is extended or adjusted under 35 U.S.C. 154(b) by 0 days.

(21) Appl. No.: 17/714,656

(22) Filed: Apr. 6, 2022

(65) Prior Publication Data

US 2023/0115627 A1      Apr. 13, 2023

Related U.S. Application Data

(60) Provisional application No. 63/253,659, filed on Oct. 8, 2021.

(51) Int. Cl.
*B60R 16/02*     (2006.01)
*H01B 7/00*      (2006.01)

(52) U.S. Cl.
CPC ....... *B60R 16/0222* (2013.01); *H01B 7/0045* (2013.01)

(58) Field of Classification Search
CPC .......................... B60R 16/0222; H01B 7/0045
USPC ...................................................... 174/152 G
See application file for complete search history.

(56) References Cited

U.S. PATENT DOCUMENTS

| | | | | |
|---|---|---|---|---|
| 3,091,795 A | * | 6/1963 | Budwig | F16L 5/027 |
| | | | | 439/550 |
| 3,252,493 A | * | 5/1966 | Smith | F16B 5/01 |
| | | | | 428/116 |
| 3,665,548 A | * | 5/1972 | Mason | F16L 5/00 |
| | | | | 403/197 |
| 4,517,408 A | * | 5/1985 | Pegram | H02G 3/0641 |
| | | | | 174/153 G |
| 5,069,586 A | * | 12/1991 | Casey | F16B 5/01 |
| | | | | 411/908 |
| 5,093,957 A | * | 3/1992 | Do | E04C 2/365 |
| | | | | 52/793.1 |
| 5,147,167 A | * | 9/1992 | Berecz | F16B 5/01 |
| | | | | 411/501 |
| 5,950,277 A | * | 9/1999 | Tallmadge | F16B 5/0258 |
| | | | | 174/153 G |
| 6,119,305 A | * | 9/2000 | Loveall | H05K 9/0018 |
| | | | | 174/152 G |

(Continued)

OTHER PUBLICATIONS

Heyco-Molded Liquid Tight Break-Thru Plugs, Available Online at: https://www.heyco.com/Hole_Plugs/product.cfm?product=HEYCo-molded-Break-Thru-Plugs&section=Hole_Plugs, Accessed from Internet on May 4, 2022, 2 pages.

*Primary Examiner* — Timothy J Thompson
*Assistant Examiner* — Michael F McAllister
(74) *Attorney, Agent, or Firm* — Kilpatrick Townsend & Stockton LLP

(57) ABSTRACT

A cable harness grommet for installation in an aircraft interior component, and method of installing the same. The cable harness grommet seals a honeycomb panel cut-out and seals the cable harness itself as the cable harness passes through the cut-out by way of an aperture in the cable harness grommet. The honeycomb panel cut-out is enclosed by the cable harness grommet such that the cable harness grommet closes and seals the honeycomb panel cut-out and the aperture around the cable harness itself, both in compliance with applicable airworthiness requirements.

10 Claims, 2 Drawing Sheets

(56) References Cited

U.S. PATENT DOCUMENTS

| | | | |
|---|---|---|---|
| 6,488,460 B1* | 12/2002 | Smith | F16B 5/0208 |
| | | | 411/339 |
| 7,100,264 B2* | 9/2006 | Skinner | B23P 9/025 |
| | | | 29/523 |
| 9,273,707 B2* | 3/2016 | Lee | A44B 13/0076 |
| 9,546,704 B2* | 1/2017 | Yasui | F16F 1/3732 |
| 9,976,583 B2* | 5/2018 | Lopez | F16B 5/01 |
| 2014/0261994 A1* | 9/2014 | Coffland | B29C 45/14549 |
| | | | 425/500 |
| 2017/0284434 A1* | 10/2017 | Lopez | F16B 5/01 |
| 2018/0151275 A1* | 5/2018 | Coyle | H02G 3/22 |

* cited by examiner

CABLE HARNESS GROMMET AND METHOD FOR USING SAME

CROSS REFERENCE TO RELATED APPLICATIONS

This application is related to and claims priority benefits from U.S. Provisional Application Ser. No. 63/253,659, filed on Oct. 8, 2021, entitled "Cable Harness Grommet and Method for Using Same," the entire contents of which are hereby incorporated in its entirety by this reference.

FIELD OF THE INVENTION

The present disclosure relates generally to cable harness grommets for application in aircraft interior components. The cable harness grommets disclosed may be used for sealing, in compliance with airworthiness regulations, a honeycomb panel of an aircraft interior component where a wire bundle passes through such honeycomb panel.

BACKGROUND

Commercial airlines operate aircraft that include interior components in their passenger areas. Typical examples of interior components include, but are not necessarily limited to galleys, lavatories, closets, crew rests, overhead stowage bins and class dividers. When designing and manufacturing such interior components, it is often advantageous to have electrical wire bundles pass through a wall of the interior component to allow for efficient wire harness routing. Such electrical wire bundles may be referred to herein as a "cable harness," as the cables are bundled or harnessed or otherwise tied or secured to one another so that a plurality of cables can be routed as a single bundle. The structures of such interior components are typically designed and manufactured using honeycomb core panels. Such panels are typically made using one or more plies of outer and inner skins bonded to a honeycomb core.

To be certified as airworthy, interior components installed on aircraft must meet all applicable requirements of the certifying airworthiness authority, for example, the Federal Aviation Administration (FAA) in the United States and the European Union Aviation Safety Agency (EASA) in Europe. Such airworthiness regulations include requirements for sealing interior components when a wire bundle is routed to pass through the interior component's honeycomb panel.

Where the aircraft interior components are already installed on an aircraft and are certified under applicable airworthiness requirements, incorporation of any type of grommet or other component that will secure or help route the wire bundles or any other new or additional cable harness grommet must also meet all such applicable airworthiness requirements and be economical to install.

When a wire bundle is required to pass through an interior component, the current process includes pre-closing the main opening by a hand-cut piece of foam. After the foam is inserted into the opening, silicon is applied via a seal gun. One side of the opening receives the silicon first, then the other side of the opening receives the silicon. The remaining silicon around the opening is smoothed manually using fingers and silicon residue is removed and wiped off with a rag.

There are break-through plugs that may be used in some instances. These plugs fill the honeycomb panel cut-out and surround the cable harness. However, such currently available products are unable to seal the cable harness within the grommet's aperture, and the cable harness grommet within the interior component honeycomb panel cut-out, in compliance with airworthiness regulations without extra materials and installation steps. One known break-through plug on the market interfaces with the panel via fingers that snap the edge of the panel installation hole. The fingers do not provide the required environmental seal. This solution thus still requires use of extra materials and installation steps, such as silicone sealant applied to the edges of the honeycomb panel cut-out and the break-through plug. Improvements to routing cables and their installation are thus desirable.

SUMMARY

The terms "disclosure," "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Aircraft flying in commercial service have to be equipped for passengers and safe to fly. The airframe manufacturers and their suppliers, in cooperation with Government regulators, such as the Federal Aviation Administration (FAA) in the United States and the European Union Aviation Safety Agency (EASA), have developed procedures, regulations, processes and certification requirements to ensure that products that are introduced into the aircraft are safe. Herein the FAA will be used as the exemplary governmental regulatory agency or administration. The FAA has certification requirements that must be met in order for a cable harness grommet, for example, to be installed in an aircraft interior component.

In one embodiment of this disclosure, there is provided a cable harness grommet that includes two halves, or membranes. Each of the halves may each be a mirror opposite of the other. Each membrane half may be manufactured from a flexible material such as, but not necessarily limited to, silicone. Further, each membrane half includes a central opening or aperture that is centered in a middle portion of the membrane. In one example, the central opening is generally circular and is sized to receive a cable harness, but is not larger than the cable harness, such that the central opening closes over and effectively seals any space that would otherwise be present around the cable harness. In use, the central opening allows a cable harness to penetrate the membrane generally perpendicular to such membrane. One membrane is installed onto one side of a honeycomb panel cut-out and the other membrane is installed onto the opposite side of the honeycomb panel cut-out, with the cable harness passing through each central aperture.

BRIEF DESCRIPTION OF THE DRAWINGS

FIG. 3 is a diagram of a typical interior component honeycomb panel including a circular cut-out sized to accept the cable harness grommet, two outer honeycomb panel skins and the honeycomb core the skins are bonded to;

Like numerals refer to like parts throughout the several views of the drawings.

DETAILED DESCRIPTION

Figure 1:
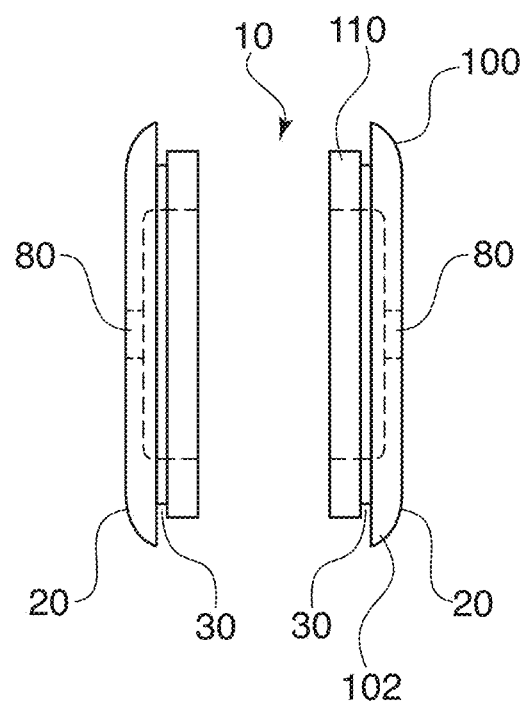
FIG. 1 is a diagram of a cable harness grommet prior to installation, demonstrating the two halves of the membrane and each halves' circumferential notch.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments. If a component is not shown in a drawing then this provides support for a negative limitation in the claims stating that that component is "not" present. However, the above statement is not limiting and in another embodiment, the missing component can be included in a claimed embodiment.

Reference in this specification to "one embodiment," "an embodiment," "a preferred embodiment" or any other phrase mentioning the word "embodiment" means that a particular feature, structure, or characteristic described in connection with the embodiment is included in at least one embodiment of the-disclosure and also means that any particular feature, structure, or characteristic described in connection with one embodiment can be included in any embodiment or can be omitted or excluded from any embodiment. Furthermore, any particular feature, structure, or characteristic described herein may be optional.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It is desirable for any cable harness passing through a honeycomb panel to prevent moisture, insects, and other unwanted items from penetrating into the hollow area of the core. The purpose of the disclosed cable harness grommet is to provide a seal for a path that allows a cable harness to pass through the honeycomb panels of galley and/or lavatory monuments installed in an aircraft. In a specific example, the grommet has two components, each component of which is a membrane made from a flexible silicon material. Each component has an outer diameter that push fits into a honeycomb panel opening and seals off the panel to the outside. Further, each membrane half includes a circular opening or aperture that is centered in middle of such membrane to allow a cable harness to penetrate the membrane perpendicular to such membrane. Depending upon the panel thickness, one membrane component will be installed on either side of the panel to close the hole within the panel. For example, one membrane is installed onto one side of a honeycomb panel cut-out and the other membrane is installed onto the opposite side of the honeycomb panel cut-out with the cable harness passing through each central aperture. There is a circumferential notch that forms a groove below the top lip of the membrane, in which the panel skin resides when the membrane is installed. This creates the environmental seal that is specified in aerospace requirements. This leads to a professional and finished installation appearance.

Referring now to the drawings, which are for purposes of illustrating the present disclosure and not for purposes of limiting the same, FIGS. 1-4 show a cable harness grommet 10 and method of installing the same. FIG. 1 shows the cable harness grommet 10 which is composed of two halves, or membranes, 20 each the mirror opposite of the other. As further demonstrated in FIG. 1, each membrane includes a cover portion 100, a panel-interface portion 110, a circumferential notch 30 and an aperture 80.

The cover portion 100 provides a smooth outer appearance to the membrane 20. It is the portion that is viewable by someone looking at the panel or monument when the cable harness grommet 10 is installed. In one embodiment, the cover portion 100 may be defined by an outer lip 102 that in use, encircles an opening in the panel. The outer lip 102 is shown as forming a generally circular outer perimeter of the membrane 20, but it should be understood that other shapes are possible and considered within the scope of this disclosure. Inward from the outer lip 102 may be a ring portion 104 that forms a raised circular circumferential ring around the membrane. The ring portion 104 may be raised with respect to an interior surface 106 of the membrane 20 and can help provide structural support to the membrane 20. Surrounded by the ring portion 104 is an interior surface 106 of the membrane 20. The interior surface supports an aperture 80.

The aperture 80 is an opening through which the cable bundle (or cables that are bundled and harnessed) can pass through. It is generally envisioned that the aperture 80 will be a central aperture positioned in the center of the interior surface 106. However, other locations on the membrane are possible, as long as the location of the aperture 80 on each membrane 20 are generally aligned in use. The aperture may be a circular opening, it may be a slit in the interior surface 106, or any appropriate opening that allows a cable bundle to pass therethrough. Due to the flexible nature of the membrane material, the membrane stretches around the inserted wire bundles, and forms a seal with the wire bundles.

The panel-interface portion 110 has a diameter that is smaller than the diameter formed by the outer lip 102 of the cover portion 100. The panel-interface portion 110 forms somewhat of an inset ledge that abuts or otherwise interfaces the interior of the opening formed in the panel or monument. The opening of the panel or monument is generally formed of a corresponding size as the panel-interface portion 110 so that the membrane 20 can be press fit into the opening. Although shown as a circular diameter, it should be understood that the panel-interface portion 110 need not be circular and may be formed in any appropriate shape. The opening in the panel or monument will generally be made in the shape of the panel-interface portion 110. (Additionally, although the panel-interface portion 110 and the cover portion 100 are both shown as circular and having the same shape, it should be understood that this is not required. The panel-interface portion 110 may have a different shape than the cover portion 100.)

Between the cover portion 100 and the panel-interface portion 110 is a circumferential notch 30. This notch 30 forms a groove that extends around an upper portion of the panel-interface portion 110. The notch is intended to receive the panel skin 70 of one side of a panel 50, as outlined in more detail below. The notch 30 allows for an environmental seal, preventing moisture or other contaminants from entering into the panel 50 itself, through the cable harness grommet 10.

Figure 2:
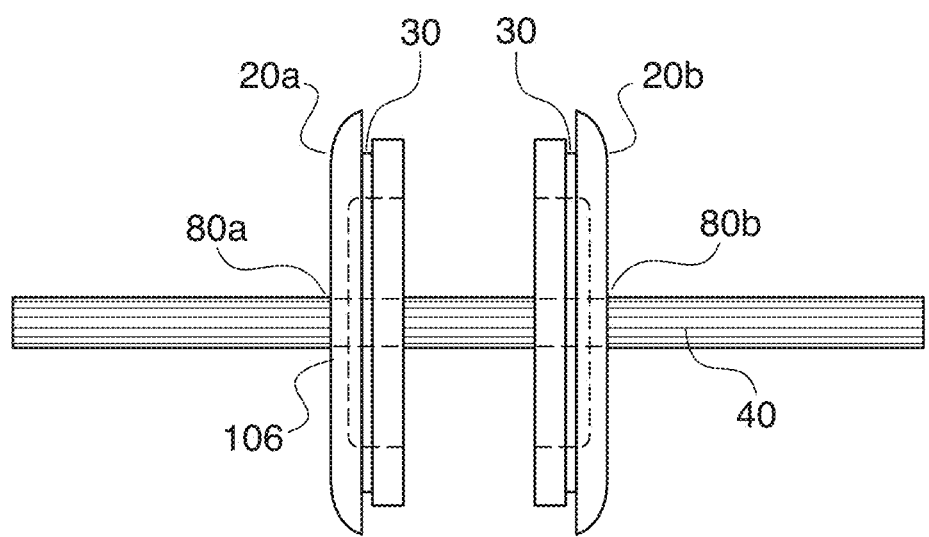
FIG. 2 is a diagram of a cable harness grommet with a cable harness passing through the grommet's aperture, demonstrating the capability of the grommet to seal the cable harness within the aperture.

As shown in FIG. 2, the cable harness 40 is inserted into a first aperture 80*a* of a first membrane 20*a* (extending through the interior surface 106) and then extends out the other aperture 80*b* of a second membrane 20*b*. Thus, the cable harness 40 penetrates each cable harness grommet membrane 20 through its aperture 80.

Figure 3:
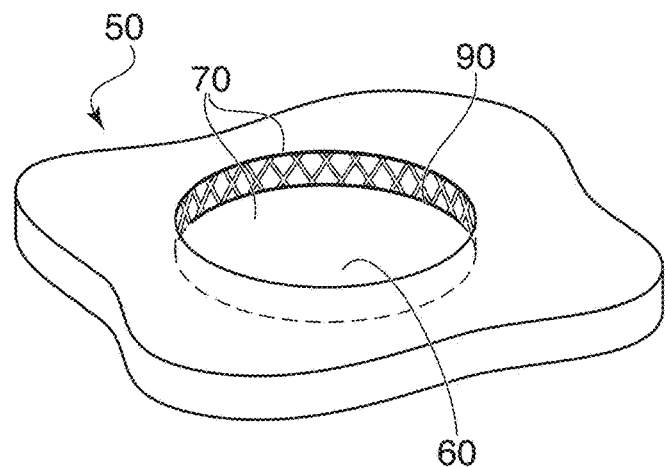

FIG. 3 shows a honeycomb panel 50. A honeycomb panel 50 typically consists of two outer panel skins 70, one on each side, bonded to a honeycomb core 90. The honeycomb panel can be used to form the structure of an aircraft interior component. The skins may be made from, for example but not limited to, fiber-glass, carbon fiber or aluminum. As shown in FIG. 3, a honeycomb panel 50 of an aircraft interior component or monument generally has a circular cut-out 60 which extends through the honeycomb panel 50. The cut-out is circular in shape and creates an opening that extends through the honeycomb panel entirely. The diameter of the cut-out 60 is designed to fit snuggly within the diameter of the membrane's circumferential notch. The honeycomb panel 50 is made up of panel skins 70 on each side (forming the exterior of the panel 50) and the honeycomb core 90 (forming the interior of the panel 50). In a preferred embodiment, the honeycomb panel cut-out 60 is sized to match the cable harness's notches 30 on each membrane 20.

Figure 4:
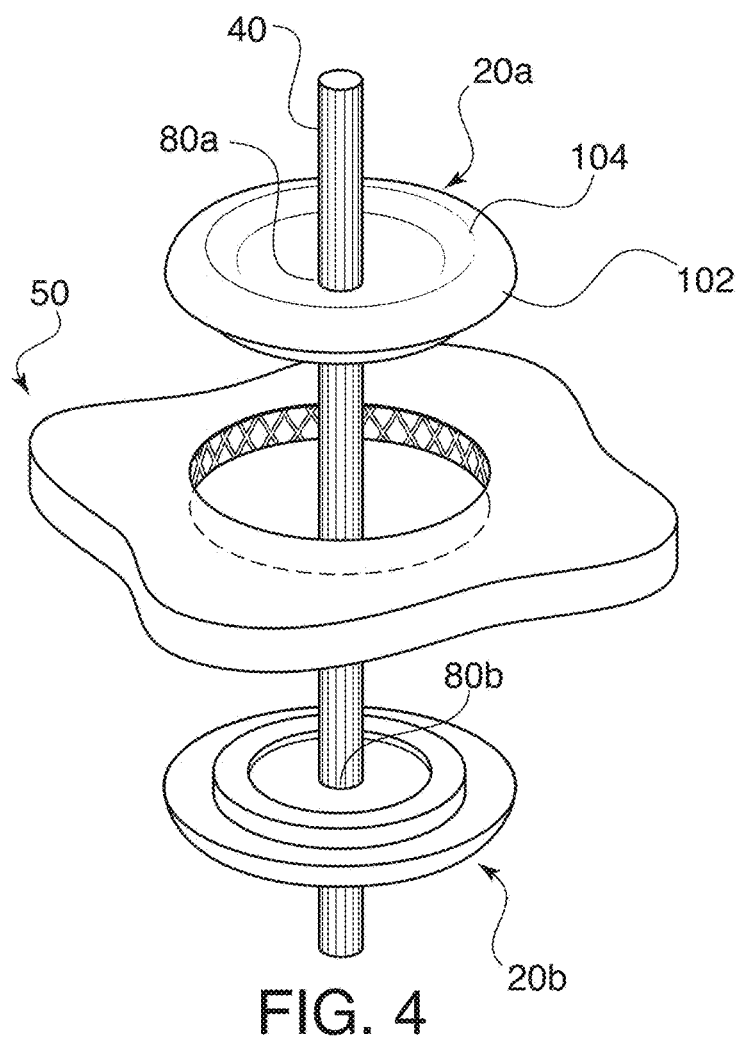
FIG. 4 is a diagram of a cable harness grommet with a cable harness passing through the grommet's aperture and the grommet installed in the interior component honeycomb panel, demonstrating the capability of the grommet to seal the honeycomb panel and the cable harness.

As shown in FIG. 4, a first installed cable harness grommet membrane 20*a* fits into the honeycomb panel 50 on one side, and the cable harness 40 fits through the cable harness grommet's aperture 80*a*. The cable harness 40 extends though the aperture 80*b* of the second membrane, installed on the opposite side of the honeycomb panel 50. One membrane half is installed into one side of the honeycomb panel 50 by push fitting it into the cut-put 60 installation hole. The outer lip 102 of the membrane half sits on the honeycomb panel outer surface and creates a seal. An additional membrane half is then installed on the opposite side of the honeycomb panel in an identical manner and forms an identical seal. The circumferential notch receives the panel skin (which resides in this notch), which creates a secure fit to the panel and seals the panel off from the outside environment.

In one embodiment, each of the two membrane halves is circular and is a mirror opposite of the other. The membrane halves may be manufactured from a flexible material such as, but not necessarily limited to, silicone. The aperture 80 is designed to fit snuggly over the cable harness. Thus, each membrane half fits snuggly onto the honeycomb panel cut-out 60 and over the cable harness 40. Two membrane halves together form the cable harness grommet 10. The circumferential notch 30 surrounds the outer panel/skin of the honey-comb panel cut-out and therefore effectively seals the cut-out in compliance with applicable airworthiness regulations. Each membrane's circumferential notch 30 is molded into the respective membrane when manufactured and is designed to effectively encase the outer honeycomb panel skins at the cut-out around each membrane's circumference. This snug fit of the honeycomb panel skin 70 within the notch 30 is what allows the grommet 10 to comply with applicable airworthiness regulations for sealing the grommet 10 to the panel 50. Further, each membrane's aperture 80 seals the cable harness 40 within the grommet in compliance with applicable airworthiness regulations.

The disclosed device and method requires less material and also reduces labor time to install compared to current methods because the cable harness grommet, and method of installation, does not require the secondary step of sealing the cable harness grommet on each side to the honeycomb panel cut-out and sealing the cable harness within the aperture with silicone in order for it to comply with applicable airworthiness regulations. The silicone that was previously applied in a secondary step is no longer necessary.

In another embodiment of the disclosure, the cable harness grommet aperture 80 can be sized to seal varying diameter cable wire harnesses 40. Cable wire harnesses consist of one or more electrical wires routed together. It is possible to provide grommets is varying sizes in order to addresses varied cable harness sizes, as well as varied cut-out 60 sizes.

In another embodiment of the disclosure, the cable harness grommet is reusable such that if it is removed from one interior component or location, it can be reused in a different interior component or location. Such reuse and installation is in compliance with all applicable airworthiness regulations.

In another embodiment of the disclosure, the cable harness grommet aperture can be utilized on aircraft interior components that are previously certified to applicable airworthiness regulations and installed on aircraft already operating. Such use and installation is also in compliance with all applicable airworthiness regulations.

In an exemplary embodiment, the honeycomb panel is part of aircraft interior component, such as an aircraft interior galley. However, it will be appreciated that a honeycomb panel can be utilized in any type of interior component typically found an aircraft, such as a lavatory, closet, crew rest, class divider or overhead bin. The disclosed grommet can be used to allow the cable harness to pass through any appropriate panel.

In an exemplary embodiment, the circumferential notch 30 is designed to tightly receive the honeycomb panel skin 70, such that the cable harness 10 may be rotated, slid, or moved, one way or the other through the aperture 80 without unsealing the honeycomb panel from the circumferential notch. This feature allows the cable harness length on either side of the aperture to be adjusted according to installation needs.

Installing a cable harness grommet according to this disclosure can eliminate the labor intensive actions needed for prior installations, while providing an appropriate solution, saving weight, reducing installation time, and providing a professional appearance. It also eliminates the waste of silicon and rags, which also reduces the burden on the environment.

As discussed above, airworthiness authorities, such as the FAA or EASA, have developed procedures, regulations, processes and certification requirements to ensure products that are introduced into aircraft are safe and meet all their applicable requirements and regulations. In a preferred embodiment, the interior component structure is formed with honeycomb panels 50, such interior component is, or has been, certified by the appropriate airworthiness agency, such as the FAA or EASA. The certification requirements include, but are not necessarily limited to, flammability and sealing. Accordingly, in a preferred embodiment, the cable harness grommet 10 compliments such certification allowing the interior component formed with the honeycomb panel 50 to remain certified as airworthy by the relevant airworthiness authority.

Example A. In one example, there is provided a cable harness grommet comprising: two membrane halves that are mirror opposites of one another, an aperture through each membrane half, and at least one circumferential notch molded into each membrane half.

Example B. The grommet of any of the preceding or subsequent examples, wherein the at least one circumferential notch is sized to encapsulate the skin of an aircraft interior component's honeycomb panel.

Example C. The grommet of any of the preceding or subsequent examples, wherein the cable harness grommet and its respective circumferential notch together are sized to enclose and seal a cut-out in an aircraft component's honeycomb panel.

Example D. The grommet of any of the preceding or subsequent examples, wherein each aperture of each membrane is are sized to enclose and seal a cable harness passing through the aperture.

Example E. The grommet of any of the preceding or subsequent examples, wherein the cable harness grommet is configured to seal a cut-out in an aircraft panel in a manner that is compliant with airworthiness regulations.

Example F. The grommet of any of the preceding or subsequent examples, wherein the circumferential notch seals a honeycomb panel cut-out in a manner that allows a cable harness to be rotated, slid, or moved through the aperture without breaking the circumferential notch seal of the honeycomb panel cut-out.

Example G. The grommet of any of the preceding or subsequent examples, wherein the cable harness grommet is reusable such that if it is removed from one interior component or location, it can be reused in a different interior component or location.

Example H. The grommet of any of the preceding or subsequent examples, wherein each membrane comprises a cover portion and a panel-facing portion, wherein the circumferential notch is positioned between the cover portion and the panel-facing portion.

Example I. The grommet of any of the preceding or subsequent examples, wherein the aperture is centered along an interior surface of each of the two membranes.

Example J. There is also provided a method for using a cable harness grommet, comprising: (a) providing the cable harness grommet of any of the preceding or subsequent examples, (b) inserting a cable harness into the cable harness grommet aperture of both membrane halves, (c) inserting the cable harness grommet with the previously inserted cable harness into a cut-out of an aircraft interior component's honeycomb panel, (d) positioning the cable harness grommet so that the at least one circumferential notch seals the aircraft interior component's honeycomb panel and seals the cable harness within the aperture, both in compliance with airworthiness regulations.

Example K. The grommet or method of any of the preceding or subsequent examples, further comprising installing the aircraft interior component into an aircraft.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples and are not limiting: alternative implementations may employ differing values, measurements or ranges. Any patents and applications and other references noted above, including any that may be listed in accompanying filing papers, are incorporated herein by reference in their entirety.

What is claimed is:

1. A cable harness grommet comprising:
   two membrane halves that are mirror opposites of one another, an aperture through each membrane half, and at least one circumferential notch molded into each membrane half,
   wherein the cable harness grommet is reusable such that if it is removed from one interior component or location, it can be reused in a different interior component or location.

2. The cable harness grommet of claim 1, wherein the at least one circumferential notch is sized to encapsulate the skin of an aircraft interior component's honeycomb panel.

3. The cable harness grommet of claim 1, wherein the cable harness grommet and its respective circumferential notch together are sized to enclose and seal a cut-out in an aircraft component's honeycomb panel.

4. The cable harness grommet of claim 1, wherein each aperture of each membrane is are sized to enclose and seal a cable harness passing through the aperture.

5. The cable harness grommet of claim 1, wherein the cable harness grommet is configured to seal a cut-out in an aircraft panel in a manner that is compliant with airworthiness regulations.

6. The cable harness grommet of claim 1, wherein the circumferential notch seals a honeycomb panel cut-out in a manner that allows a cable harness to be rotated, slid, or moved through the aperture without breaking the circumferential notch seal of the honeycomb panel cut-out.

7. The cable harness of claim 1, wherein each membrane comprises a cover portion and a panel-facing portion, wherein the circumferential notch is positioned between the cover portion and the panel-facing portion.

8. The cable harness of claim 1, wherein the aperture is centered along an interior surface of each of the two membranes.

9. A method for using a cable harness grommet, comprising:
   (a) providing the cable harness grommet of claim 1;
   (b) inserting a cable harness into the cable harness grommet aperture of both membrane halves,
   (c) inserting the cable harness grommet with the previously inserted cable harness into a cut-out of an aircraft interior component's honeycomb panel,
   (d) positioning the cable harness grommet so that the at least one circumferential notch seals the aircraft interior component's honeycomb panel and seals the cable harness within the aperture, both in compliance with airworthiness regulations.

10. The method of claim 9, further comprising installing the aircraft interior component into an aircraft.

* * * * *